United States Patent [19]

Filitz et al.

[11] Patent Number: 5,048,239
[45] Date of Patent: Sep. 17, 1991

[54] APPARATUS FOR MOUNTING A DECOMPRESSION WALL PANEL IN AN AIRCRAFT OR SPACECRAFT

[76] Inventors: Wolfhard Filitz; Robert Finkbeiner; Harald Knothe, all c/o Deutsche Airbus GmbH, Patent Dept., P.O. Box 107845, D 2800 Bremen 1, Fed. Rep. of Germany

[21] Appl. No.: 542,923

[22] Filed: Jun. 22, 1990

[30] Foreign Application Priority Data

Jul. 5, 1989 [DE] Fed. Rep. of Germany ....... 3922025

[51] Int. Cl.⁵ .............................................. E05C 9/02
[52] U.S. Cl. .......................................... 52/1; 49/465; 292/DIG. 65; 244/118.5
[58] Field of Search ....................... 52/1, 127.7, 127.8, 52/98; 49/31, 141, 465; 292/92, DIG. 65; 244/129.1, 118.5, 119

[56] References Cited

U.S. PATENT DOCUMENTS 4,050,204 9/1977 Scott ......................................... 52/1
4,269,376 5/1981 Haux et al. ............................. 52/1

Primary Examiner—Richard E. Chilcot, Jr.
Assistant Examiner—Robert Canfield
Attorney, Agent, or Firm—W. G. Fasse

[57] ABSTRACT

Damages to load supporting structures in an aircraft or spacecraft resulting from an explosive decompression are minimized or avoided by rapidly making available at least one relatively large flow-cross-sectional area. This is accomplished by mounting a decompression panel with a plurality of releasable mounting locks to a frame. The locks are so constructed that the panel along can be blown out in one direction and the panel with the frame and the locks can be blown out in the opposite direction in response to a rapid pressure increase which shears off shearing pins normally holding locking levers in a clamp-down or hold-down position. The frame has support flanges against which the panel and a wall section rest. The locks rest on and are secured to the frame and respond to defined release pressure ratios between the inside and outside in either direction. Each lock has at least one locking or clamp-down lever for the panel and one for a wall section. The locking levers can journal about a common journal axis after the respective shearing pins have been sheared off in response to the required pressure difference between the inside and the outside.

10 Claims, 4 Drawing Sheets

APPARATUS FOR MOUNTING A DECOMPRESSION WALL PANEL IN AN AIRCRAFT OR SPACECRAFT

FIELD OF THE INVENTION

The invention relates to an apparatus for mounting decompression wall panels in aircraft and spacecraft. Such decompression panels form load supporting structures for avoiding damages resulting from an explosive decompression. At least one decompression panel is mounted in a partition wall separating single rooms of the vehicle by means of a frame having a support flange and at least one mounting device, whereby the panel can be pressed out of the partition wall when predefined release pressure ratios between the inside and outside have been reached.

BACKGROUND INFORMATION

In aircraft and spacecraft, explosive decompressions can occur when flying at altitudes where the air pressure is distinctly lower than close to the ground. Since it is necessary to create air pressure ratios inside aircraft and spacecraft, such as exist close to the ground, an excess pressure relative to the environment builds up in the body of the craft. Inside such vehicles, it is also necessary to provide a pressure compensation system for chambers that are separated by partition walls, such as between passenger areas and baggage compartments. Without a pressure compensation system, explosive decompression would threaten to destroy the partition wall and the control systems that are normally installed therein. The load supporting structures in the aircraft and spacecraft would also be endangered by such uncontrolled decompression.

A device of this type has been disclosed in German Patent Publication DE-PS 3,715,328, describing a decompression panel inserted in a frame which has a support flange on one side, for both the decompression panel and the partition wall. Several retaining springs embracing the decompression panel and the partition wall and having special rated break points, are mounted on the other side of the frame. A disadvantage of the known structure is seen in that the release pressure ratios can be changed only by a corresponding construction of the retaining springs. This involves a substantial manufacturing effort and expense. Furthermore, it has to be considered that the assembly of such retaining springs is rather complicated and cumbersome. When a retaining spring breaks, it must be completely replaced. Furthermore, the known decompression panels are not capable of preventing damages to the load supporting structures with adequate assurance, since due to the functional principle, the desired rapid release of large cross-sectional flow areas to lessen the delay of an explosive decompression, cannot be achieved satisfactorily.

OBJECTS OF THE INVENTION

In view of the above it is the aim of the invention to achieve the following objects singly or in combination:

to provide a reliable mounting structure for panels or wall sections which enables an assembly with a minimal production effort and expense;

to make rapidly available large cross-sectional flow areas for an effective release of explosion pressures;

to provide a mounting structure for partition wall panels and wall sections of an aircraft or spacecraft, which permits a yielding of the panel or wall section in either direction away from an explosion source; and to construct a panel mounting device with replaceable shearing pins so that the mounting structure itself will be reusable by merely replacing the shearing pins.

SUMMARY OF THE INVENTION

According to the invention, each mounting device is constructed as a releasable lock which is fastened through a base plate to the side of the frame opposite the support flange. Each lock engages the partition wall and the panel with at least one locking lever. Each locking lever is journalled to the base plate so it can tilt. Each locking lever is secured in its fastening or locking position by a shearing safety element. Such a releasable lock can be manufactured and assembled with extraordinary ease, and it is possible to set conveniently specific release pressure ratios between the inside and the outside of the panel by dimensioning and/or by respectively selecting the material for the shearing safety element accordingly and/or by changing the length of the locking levers. It is also advantageous that invariably only a defined break in the shearing safety element will take place when the releasable lock is actuated, instead of breaking of a locking lever. This feature eliminates the necessity of having to provide a rated break point when dimensioning the locking lever.

According to a preferred embodiment of the invention, all locking levers are journalled to or tiltable about the same journal shaft or axis. This feature provides a particularly simple construction of the releasable lock and requires few parts.

The construction of the locking lever according to another preferred embodiment is similar for all levers, whereby the locking levers on the rotational or journal axis are supported for alternately and laterally engaging the partition walls and the panel, and each locking lever is preferably secured to the rotational or journal axis in its engaging position by a shearing pin.

This construction of the locking levers simplifies the assembly, particularly when the locking levers have an assembly clamping cam above their bearing or mounting area on the rotational axis. The shearing pins are conveniently inserted when the locking levers are in their panel or wall engaging position by simply applying pressure to these clamping cams with a clamping tool.

According to an alternative preferred construction of the invention, the present lock has at least one fastening lever which is surrounded in the bearing area by another yoke-or fork-shaped bearing lever, whereby preferably all locking levers are secured to the base in their panel or wall engaging position by a common shearing pin. Furthermore, this construction of the lock assembly is especially advantageous for the assembling if the locking levers have a pressure assembly surface above their bearing area on the rotational axis, because in such a construction, pressure needs to be applied merely by a suitable pressing device to perform the assembly by inserting the journal shaft.

Preferably, the assembly of the lock components and the construction of the releasable lock are further simplified, if the journal or rotational axis is itself secured against rotation by at least one shearing pin.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
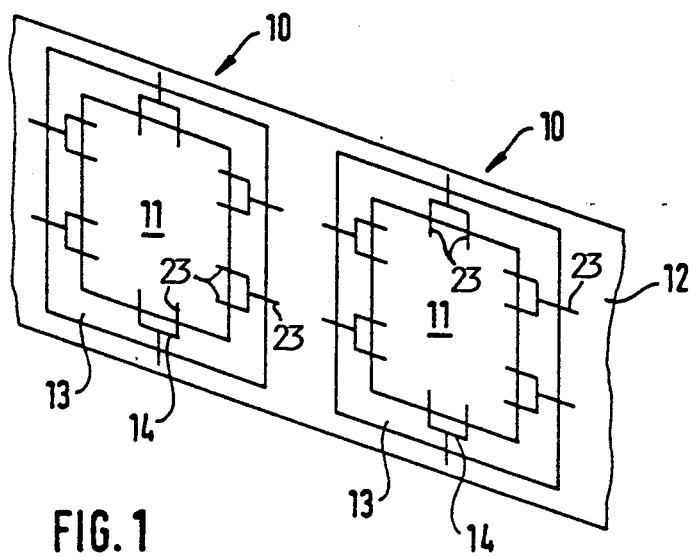
FIG. 1 is a schematic illustration of a partition or wall in an aircraft or in a spacecraft, with two releasable panels installed by means of mounting structures according to the invention.
Figure 3:
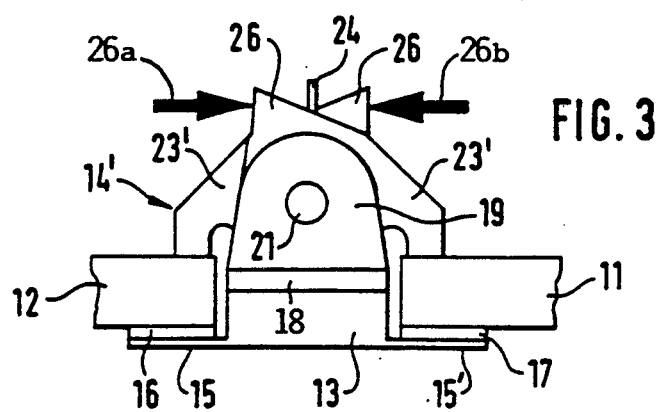
FIG. 3 is a front elevational view of a modified version of the releasable lock of FIG. 2, wherein operating cams are provided on the locking levers approximately above their bearing area on a journal shaft.
Figure 5:
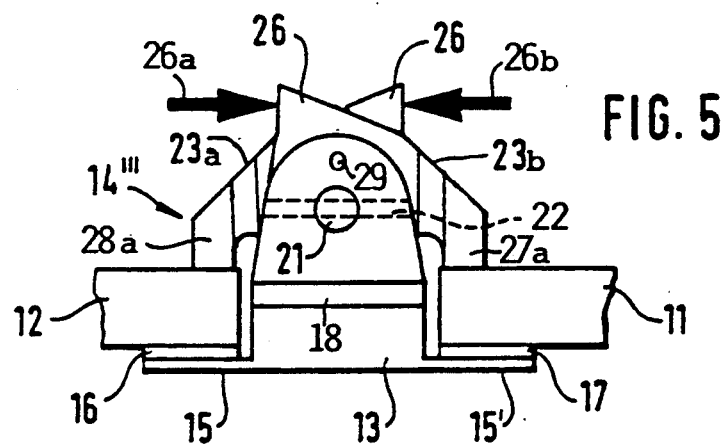
FIG. 5 is a front elevational view similar to that of FIG. 3, but showing a modification of the embodiment of FIG. 3, wherein the locking levers are provided with operating cams for moving the locking levers into a clamp-down position.
Figure 6:
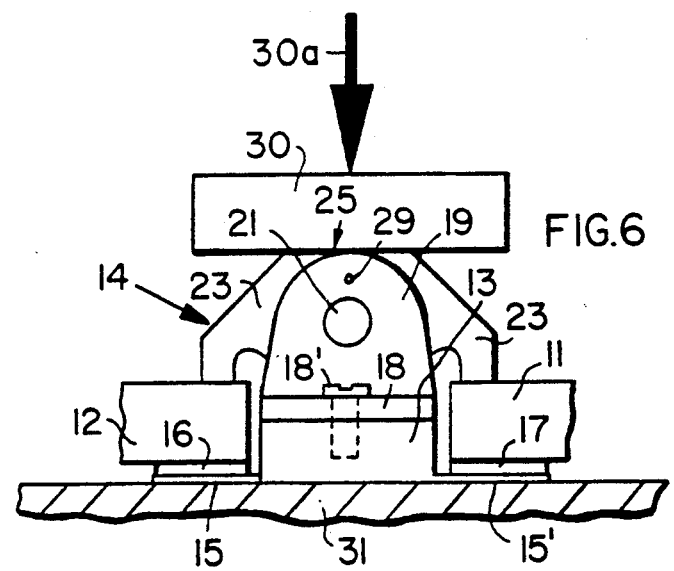
FIG. 6 is a front elevational view for illustrating the mounting of locks according to the invention with the aid of a hold-down tool.

FIG. 1 illustrates two decompression panel systems 10 for avoiding damages to load carrying structures, such as a wall 12, e.g. a partition wall in an aircraft or spacecraft following an explosive decompression. Each system 10 comprises a decompression panel 11 that is mounted in the partition wall 12 by means of a frame 13 and several, e.g. six, releasable locks 14 distributed, preferably uniformly, around the periphery of the decompression panel 11 as shown and fastened to the frame 13. The locks 14 have locking levers 23 journalled to a lock body and bearing against the partition wall 12 on one side and against the panel 11 on the other side. The frame 13, as can be seen in FIGS. 3, 5, and 6, has two peripheral seating or support flanges 15, 15' on the side opposite the releasable locks 14. On one side of the frame 13, the flange 15 bears against the partition wall 12 through a seal 16, while the flange 15' on the other side of the frame 13 bears against the panel 11 through a seal 17. These relationships are best seen in FIGS. 3, 5, and 6.

Figure 2:
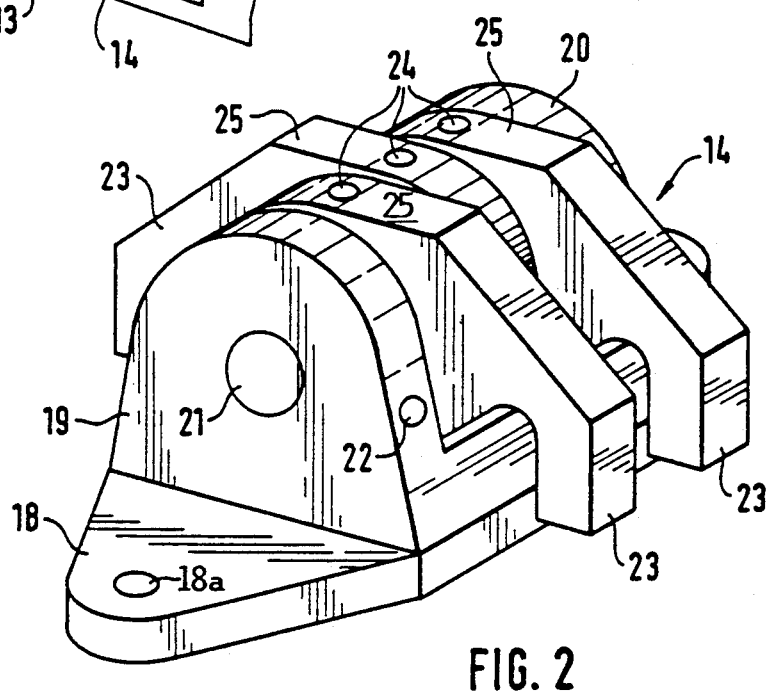
FIG. 2 is a perspective view of a first construction embodiment of a releasable lock having three locking levers, each of identical construction.

FIG. 2 shows a first embodiment of the present releasable lock 14 comprising a lock body having a base plate 18 with two vertical bearing flanges 19 and 20. A journal shaft 21 extends between the bearing flanges 19 and 20 and the ends of the shaft 21 are secured to these flanges so as to be prevented from rotating and axial shifting, by means of a shearing pin 22 extending through the bearing flanges 19 and/or 20 and into the shaft 21. Three locking levers 23, identical in form and similar to a toggle lever, are journalled on the shaft 21, so that these locking levers 23 extend alternately to the left and to the right for engaging and clamping down on the partition wall 12 and on the panel 11 against the flanges 15, 15' of the frame 13 through the respective seals 16, 17 as best seen in FIG. 3. Each of the locking levers 23 is secured to the shaft 21 by a shearing pin 24. In a completely assembled state, the arrangement is such that each shearing pin 24 extends through a fitting bore in its locking lever 23 and into the shaft 21 when the respective locking lever 23 is in its hold-down or clamp-down position. The length of the shearing pin 24 is so dimensioned that either one or two shearing planes exist between the locking lever 23 and the journal shaft 21, whereby the shear-off conditions can be changed conveniently. When the pins 24 are sheared off, the levers 23 can rotate about the fixed shaft 21 to release the panel 11 and/or the wall 12. Each locking lever 23 has a pressure application surface 25, which is preferably located above the journal shaft 21. By applying a force to the surface 25 the respective lever 23 can be held in a position for a convenient insertion of the respective shearing pin 24.

FIG. 3 shows a modified embodiment which simplifies assembling of the releasable lock 14' by means of assembly tool engagement cams 26 on the top surfaces of the locking levers 23'. These top surfaces are shown at 25 in FIG. 2. In FIG. 3, the actuating direction of a clamping tool (not shown) is indicated by the arrows 26a and 26b shown on each side of the cams 26, which are preferably arranged above the journal shaft 21. The shearing pins 24 are shown in a position just before being completely inserted. In the shown position of the shearing pins 24, the locking levers 23' can be rotated into the hold-down or locking position. When that position is reached, the pins 24 are completely inserted. Horizontal forces 26a, 26b bring the levers 23' into the locking or clamp-down position.

Figure 4:
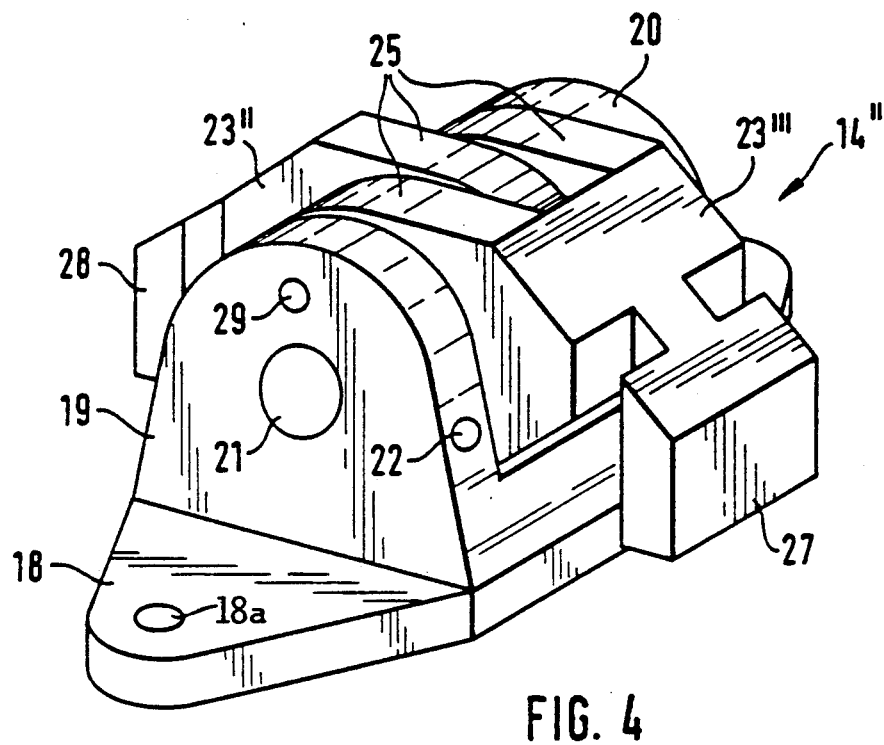
FIG. 4 is a perspective view of a further structural embodiment of a releasable lock having two different fastening or locking levers, one of which is forked.

FIG. 4 shows another embodiment of the present releasable lock 14" in which a first locking lever 23" is mounted between the legs of a forked locking lever 23' in the bearing area on the journal shaft 21. The locking levers 23" and 23''' have enlarged hold-down heads 27 and 28. Here, the locking levers 23' and 23''' are secured against journalling to flanges 19 and 20 of the base plate 18 by means of a shearing pin 29, which, in the assembled position, extends through a bore parallel to journal shaft 21 and preferably through both flanges 19, 20.

FIG. 5 illustrates a front elevational view of a releasable lock 14''' that has substantially the same construction as shown in FIG. 4, except that the single prong lever 23a and the double prong, forked lever 23b are provided with operating cams 26 just as in FIG. 3 for facilitating bringing these levers 23a and 23b into the clamp-down position by the application of a horizontal force 26a, 26b as in FIG. 3, rather than by a downwardly directed force as in FIGS. 2 and 4.

FIG. 6 shows a simple way of mounting the present releasable locks with the aid of a hold-down tool 30 that bears down on the surfaces 25 with a hold-down force 30a taken up by a counterholder 31. With the hold-down force 30a effective, it is easy to insert the shearing pin 29 and to secure the base plate 18 of the lock body to the central portion of the frame 13, for example, by rivets or screws 18' passing through holes 18a, e.g. shown in FIG. 4.

However, it is also possible to insert the shearing pin before mounting the releasable lock 14 to the frame 13, whereby the locking levers are already in the fixed hold down position when the lock is secured to the frame 13. Such securing is possible because the seals 16 and 17 are sufficiently elastically deformed to permit firmly securing the base plate 18 to the frame 13.

Figure 7:
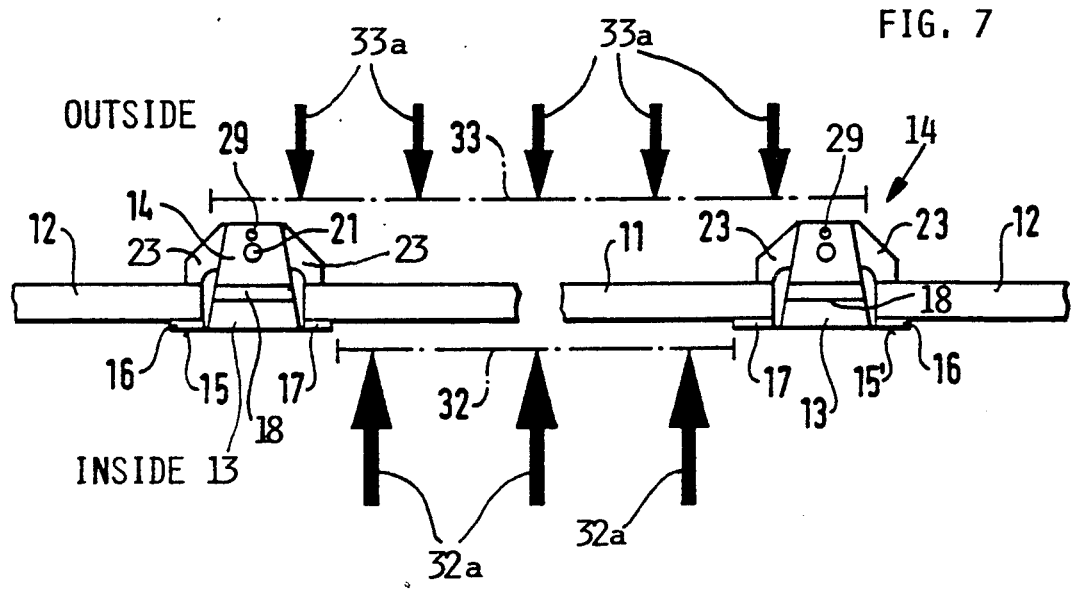
FIG. 7 shows a schematic side view of two releasable locks according to the invention to illustrate the ratio of the opposing pressures on opposite surface areas of a decompression panel held in place by the present locks, whereby the resulting forces balance each other and the panel is held in place.

FIG. 7 shows a schematic elevational side view, wherein the dash-dotted line below the panel 11 indicates a surface area 32 exposed to an inner pressure represented by the bold arrows 32a. The dash-dotted line above the panel 11 indicates a comparatively larger surface area 33 exposed to the outside pressure represented by smaller arrows 33a. The difference in the pressure exposed surfaces 32 and 33 results in a force ratio which influences the required number of releasable locks per panel, the material selection for the panels 11, and the diameter and number of shear sections on the shearing pins. This force ratio also determines the effective length dimensions for the locking or clamp-down levers 23, 23', 23", 23''', 23a, 23b. In FIG. 7 the relevant forces balance each other so that the panel 11 stays in place under normal operating conditions.

Figure 8:
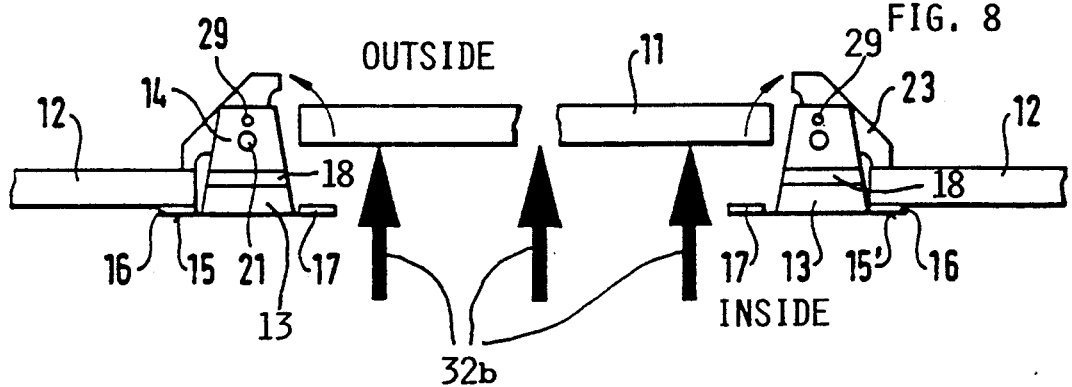
FIG. 8 is an illustration similar to that of FIG. 6 for showing the functional principle under suddenly occurring high inside pressure which pushes a decompression panel out.

FIG. 8 illustrates a sudden increase in the inside pressure 32b resulting in a blow-out of the panel 11 because the surface area 32 corresponding to the area of the panel 11 minus the peripheral sealing area of the flanges 15, 15' and the seal 17 are exposed to a larger pressure 32b than the outer pressure 33a. The panel 11 consequently moves against the respective levers 23 and swings these levers upwardly around the journal 21 after the shearing pin 24 or 29 has been sheared off. The other levers 23 bearing against the wall section 12 remain in a wall engaging position in this situation. The panel engaging levers swing out far enough so that panel 11 is released from the respective levers 23, thereby suddenly opening a rather large cross-sectional flow area, which lessens significantly the effects of an explosive blow-out decompression.

Figure 9:
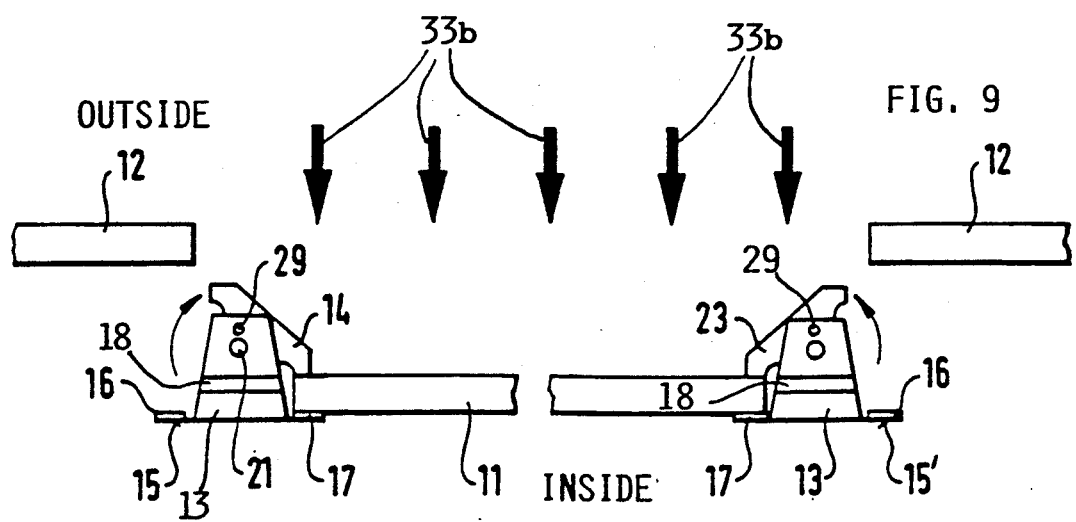
FIG. 9 shows a view similar to that of FIGS. 6 and 7, but now illustrating the functional principle under suddenly occurring high outside pressure which pushes the decompression panel and the locks into a wall enclosed space.

FIG. 9 illustrates an explosive type increase of the outside pressure 33b causing a blow-in. The outside pressure 33b is effective on the overall greater surface area 33, which includes the area of the panel 11 plus the area of the frame 13. Now, the levers 23 engaging the partition wall section 12 tilt around the journal 21, shearing off the shearing pin 29 and tilting up sufficiently for releasing the panel 11 and the frame 13 with the locks 14 to thereby open the pressure compensation cross-sectional flow area 33.

Referring again to FIG. 5, the shearing pin 22 shown by dashed lines passes entirely through the journal shaft 21, thereby providing two shearing zones. However, a single shearing zone between flange 19 and shaft 21 may be sufficient. In that case the pin 22 merely passes into the shaft 21, but not through it.

Although the invention has been described with reference to specific example embodiments, it will be appreciated that it is intended to cover all modifications and equivalents within the scope of the appended claims.

What we claim is:

1. An apparatus for mounting a decompression wall panel to a wall for normally closing a hole in said wall, comprising locking means for releasably securing said panel to a frame surrounding said hole with a first frame flange bearing against said wall and a second frame flange bearing against said panel, said locking means comprising a lock body securable to said frame on a side opposite said frame flanges, at least one first locking lever tiltable in one direction for holding said first frame flange against said wall, at least one second locking lever tiltable in the opposite direction for holding said panel against said second frame flange, journal means secured to said lock body for tiltably mounting said first and second locking levers to said lock body, and shearing means for securing said first and second locking levers against rotation relative to said lock body to prevent tilting of said locking levers about said journal means under normal operating conditions, said shearing means shearing in response to a predetermined pressure difference across said wall panel for permitting movement of said wall panel in any one of two opposite directions.

2. The apparatus of claim 1, wherein said journal means comprise a single journal shaft on which all locking levers are journalled.

3. The apparatus of claim 1, wherein a plurality of said locking levers are arranged to reach alternately in opposite directions, so that one set of locking levers reaches onto said wall while another set of locking levers reaches onto said wall panel, whereby locking levers of one set reach alternately with locking levers of the other set along said journal shaft.

4. The apparatus of claim 1, wherein said shearing means comprise at least one shearing pin for each locking lever, said shearing pin securing its respective locking lever to said journal means against rotation around said journal means relative to said lock body until said shearing pin is sheared off.

5. The apparatus of claim 1, wherein said locking levers comprise a pressure application surface.

6. The apparatus of claim 1, wherein one of said first and second locking levers is a one armed lever, while the other locking lever is a double armed forked locking lever, and wherein said one armed locking lever is mounted between the arms of said forked locking lever.

7. The apparatus of claim 1, wherein said shearing means comprise a single shearing pin provided in common for all locking levers, said single shearing pin passing through all locking levers and through said lock body.

8. The apparatus of claim 1, wherein each of said locking levers comprises a tool engagement cam.

9. The apparatus of claim 1, comprising further shearing means for securing said journal means to said lock body against relative rotation between said lock body and said journal means.

10. The apparatus of claim 9, wherein said journal means comprising a journal shaft, said further shearing means comprising a shearing pin passing entirely through said journal shaft to provide two shearing zones.

* * * * *